(12) United States Patent
Brunner et al.

(10) Patent No.: US 7,148,903 B2
(45) Date of Patent: Dec. 12, 2006

(54) IMAGE RECONSTRUCTION METHOD AND COMPUTER PROGRAM PRODUCT

(75) Inventors: Thomas Brunner, Nürnberg (DE); Stefan Böhm, Oberasbach (DE); Joachim Hornegger, Möhrendorf (DE); Christian Neumair, Eichstätt (DE)

(73) Assignee: Siemens Aktiengesellschaft, Munich (DE)

( * ) Notice: Subject to any disclaimer, the term of this patent is extended or adjusted under 35 U.S.C. 154(b) by 281 days.

(21) Appl. No.: 10/778,381

(22) Filed: Feb. 13, 2004

(65) Prior Publication Data

US 2004/0257381 A1    Dec. 23, 2004

(30) Foreign Application Priority Data

Feb. 13, 2003    (DE) ................. 103 06 016

(51) Int. Cl.
*G09G 5/00*    (2006.01)
(52) U.S. Cl. ............ 345/626; 345/627; 345/628; 382/131
(58) Field of Classification Search ........... 345/626, 345/629, 627, 427, 628; 382/131
See application file for complete search history.

(56) References Cited

U.S. PATENT DOCUMENTS 4,590,558 A    5/1986    Glover et al.

6,845,142 B1 *    1/2005    Ohishi ........................ 378/8

FOREIGN PATENT DOCUMENTS

DE    100 09 395    9/2001
DE    100 51 158    1/2002

OTHER PUBLICATIONS

"Defect Interpolation in Digital Radiography—How object-Oriented Transform Coding Helps," Aach et al., Proceedings of SPIE, vol. 4322, (2001), pp. 824-835.
"Practical Cone-Beam Algorithm," Feldkamp et al., J. Opt. Soc. Am., A/vol. 1, No. 6, Jun. 1984, pp. 612-618.

* cited by examiner

*Primary Examiner*—Kimbinh T. Nguyen
(74) *Attorney, Agent, or Firm*—Schiff Harden LLP

(57) ABSTRACT

In a method for reconstructing a three-dimensional subject a number of projections of a three-dimensional subject is acquired by an acquisition arrangement. Each projection is a dataset of spatially contiguous data values. The projections are provided to a computer. A first part of the data values of the projections is replaced by new data values, and a second part of the data values of the projections remains unchanged. Thus changed projections are generated, using which a reconstruction of an image of the subject is determined by the computer.

26 Claims, 10 Drawing Sheets

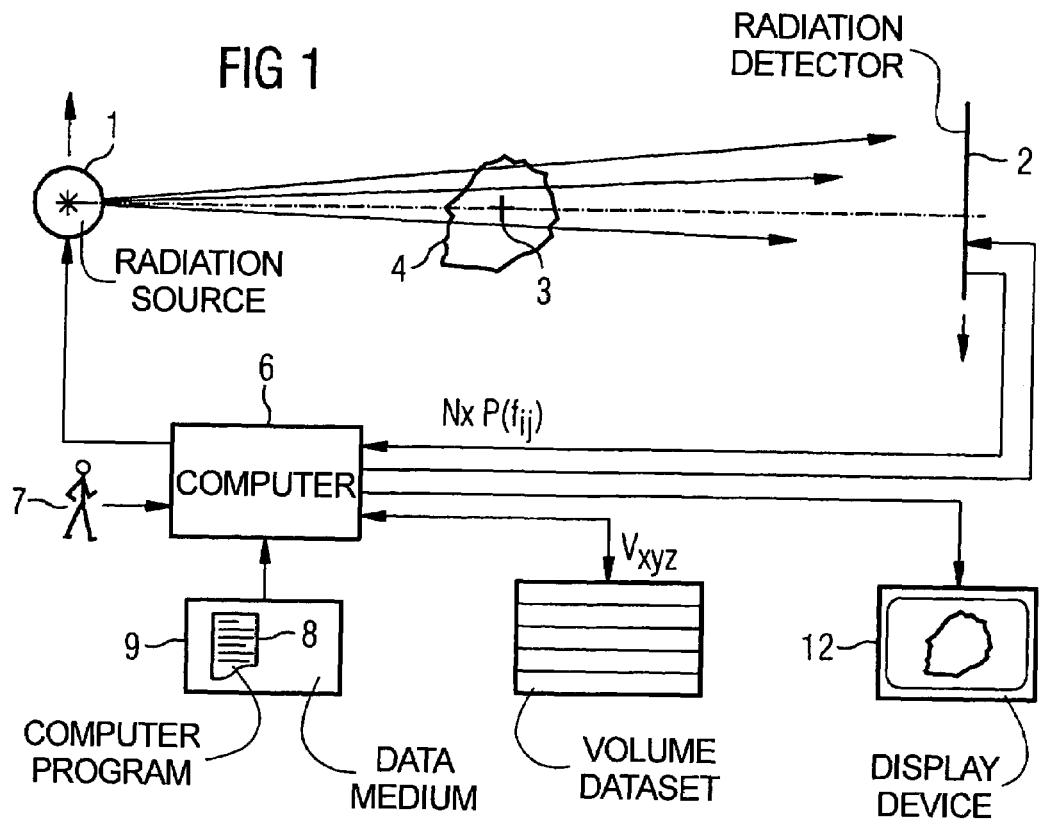
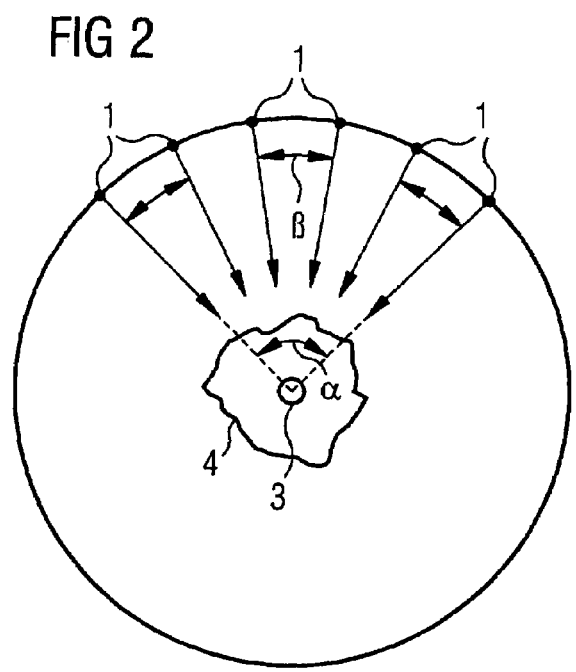

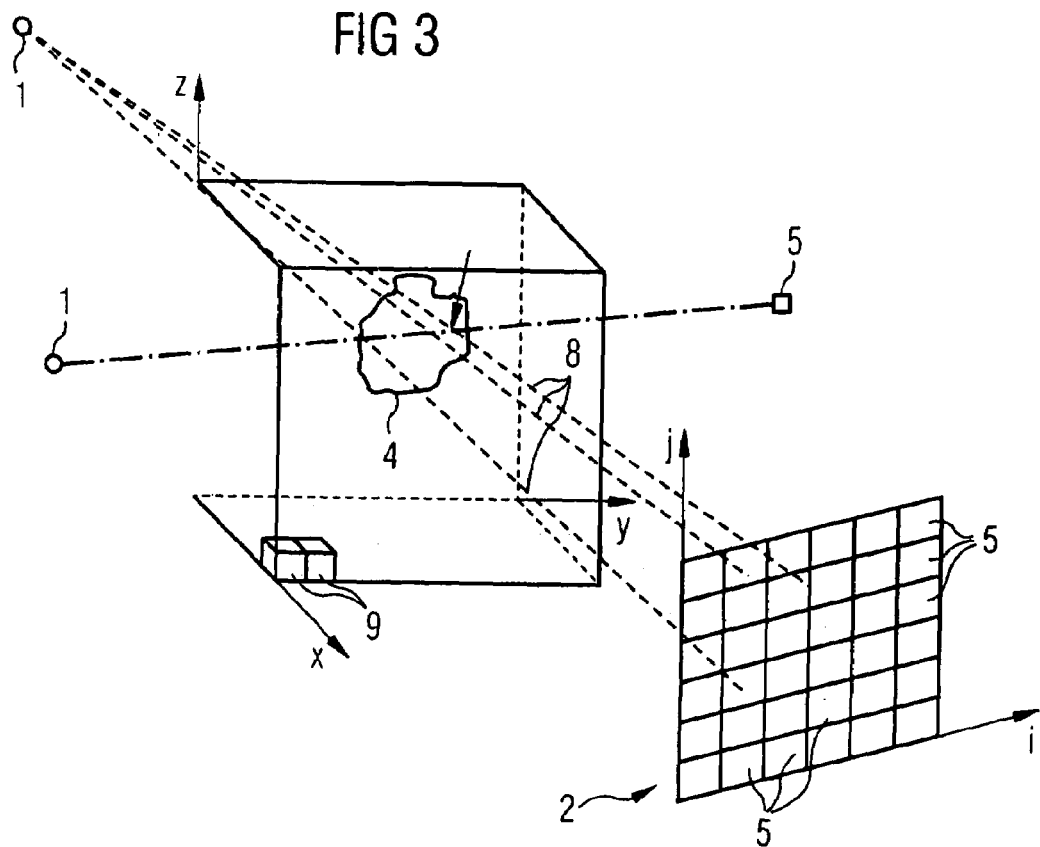
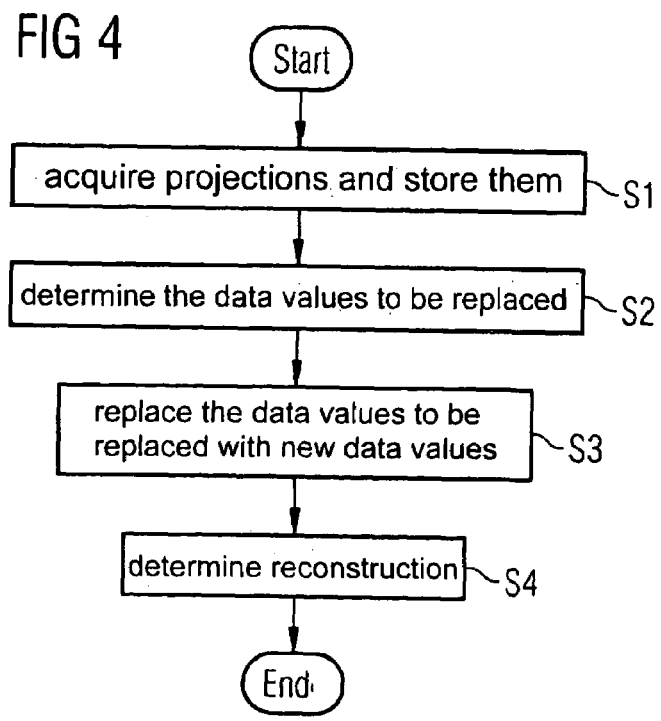

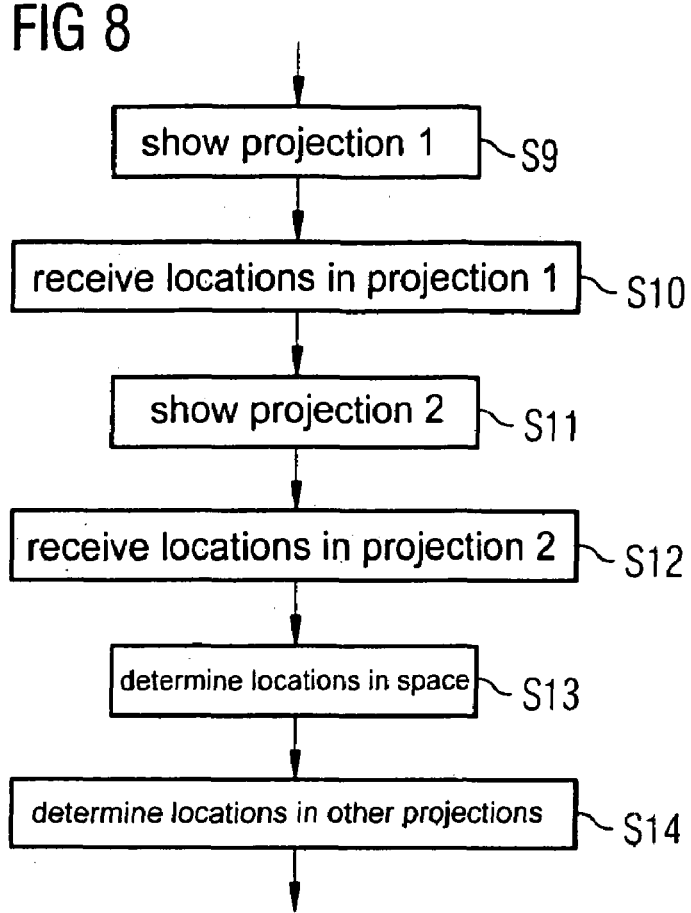
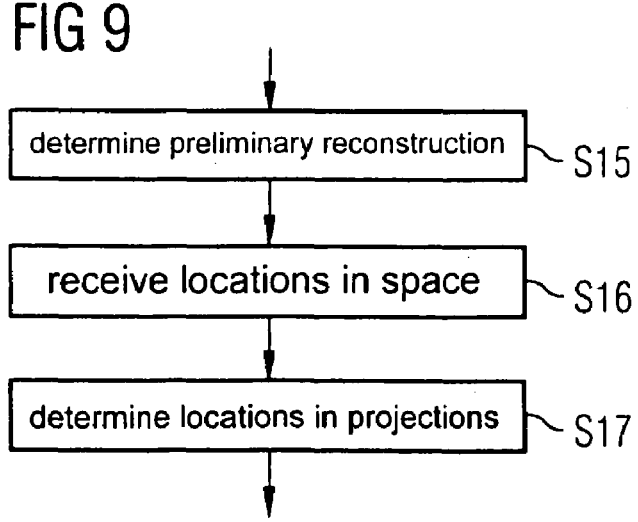

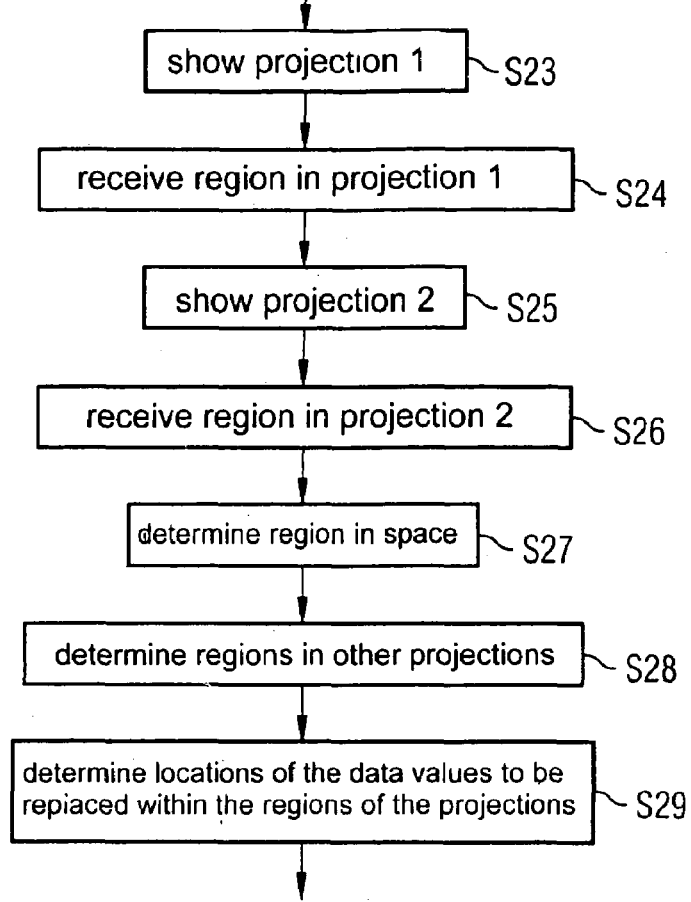
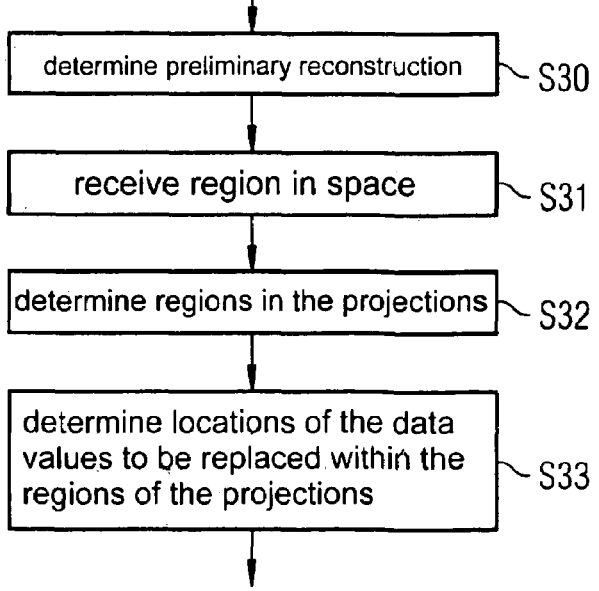

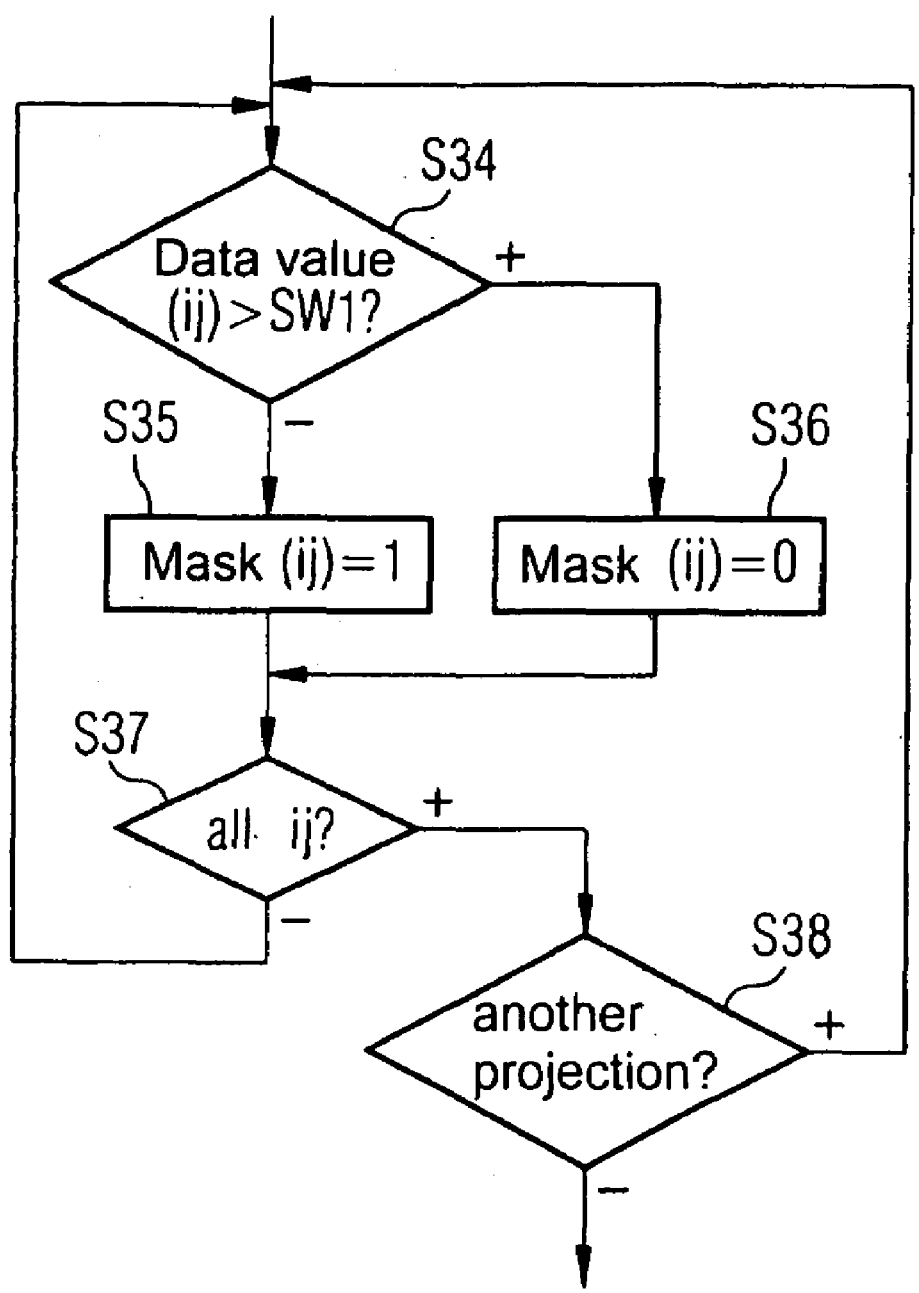

IMAGE RECONSTRUCTION METHOD AND COMPUTER PROGRAM PRODUCT

BACKGROUND OF THE INVENTION

1. Field of the Invention

The present invention concerns a method for reconstructing of a three-dimensional subject using a number of projections of a subject acquired by an acquisition arrangement, wherein each projection is a dataset of spatially contiguous data values, and wherein the acquired projections are provided to a computer with which the reconstruction is determined.

The present invention furthermore concerns a computer program, stored on a data medium, to implement such a method, and a computer that is programmed to execute such a method.

2. Description of the Prior Art

Methods of the above general known, and are used, for example, in computed tomography and 3D angiography.

In such known procedures, artifacts are often created, in particular by metal parts in the subject. Depending on the position of the individual case, these artifacts are not interfering, very interfering but tolerable, or unacceptable.

SUMMARY OF THE INVENTION

An object of the present invention is to provide a method for reconstruction of a three-dimensional subject wherein artifacts can be reduced and even largely eliminated in a series of cases.

This object is achieved in a method wherein a first part of the data values of the projections is replaced by new data values and a second part of the data values of the projections remains unchanged, and thus changed projections are generated and the reconstruction is done by the computer using the changed projections.

The invention is based on the recognition that artifacts can be most simply prevented if the input data for the reconstruction, i.e., the projections, are already suitably prepared before the actual reconstruction.

In the simplest case, which of the data values are to be replaced is predetermined for the computer by a user for each of the acquired projections. This method can always be implemented, however it is tedious and complicated for the user.

It is significantly more comfortable when which of the data values are to be replaced is predetermined for the computer by the user for at least two—preferably exactly two—of the acquired projections, and using these requirements the computer automatically determines which data values are to be replaced in the other acquired projections. The projections operated on by the used preferably an angle that is close to 90°.

As an alternative to the specification of the data values to be changed in two projections, it is also possible to undertake a preliminary reconstruction in the computer using the acquired projections, and in the preliminary reconstruction at least one location in three-dimensional space is provided to the computer by a user; and the data values of the acquired projections that are to be replaced automatically determined by the computer using the at least one location.

As an alternative to the manual specification by the user of the data values to be replaced, it is also possible for the computer to automatically determine the data values to be replaced using the data values of the projections. It is theoretically possible for the computer to determine the data values to be replaced in the projections as a whole, however, a two-stage, interactive procedure is preferred. In the first stage, at least one spatially contiguous region is given to the computer by the user, inside of which or outside of which the computer then determines the data values to be replaced.

Analogously to the manual specification of the data values to be replaced, it is also possible for the user to provide at least one spatially contiguous region to the computer by the user for each of the acquired projections, and the computer then determines the data values to be replaced exclusively inside of or outside of the region.

When a number of regions that are spatially separate from one another but spatially contiguous are provided, the regions are linked with one another either by means of an OR-relation or by means of an AND-relation. When the data values to be replaced are to be determined exclusively within the predetermined regions, the regions are OR-related. When the data values to be replaced are to be determined exclusively outside of the predetermined regions, the regions are AND-related.

Likewise analogously to the specification of the data values to be replaced, it is again more comfortable when at least one spatially coherent region is provided to the computer by a user for at least two—preferably exactly two—of the acquired projections. The computer then determines the data values to be replaced exclusively inside of or exclusively outside of the regions with regard to these acquired projections; and, using the predetermined regions, the computer automatically determines in the other acquired projections inside of or outside of which regions the data values to be replaced are to be determined by it. Here as well, the initial two projections should from preferably substantially a right angle relative to each other.

Again an alternative is possible, wherein a preliminary reconstruction is determined by the computer using the acquired projections; with at least one spatially contiguous region in the three-dimensional space being provided to the computer by the user. Using this region the computer determines corresponding regions in the acquired projections; and the data values to be replaced are determined exclusively inside of or outside of the corresponding regions.

To determine the data values to be replaced, it is possible to determine these by the computer exclusively using the data values to be replaced themselves. For example, the data values can be compared by the computer with a threshold determined in advance or given in advance to the computer.

It is preferable for the data values to be replaced by the computer to be determined using the data values to be replaced themselves and the spatially adjacent data values, in particular the spatially directly adjacent data values. In this case an edge detection can be undertaken, for example by comparison of the difference of directly adjacent data values with a static or dynamic threshold. Closed surfaces arising thus can then be filled in a known manner. Other or additional pre-processings are possible, for example an expansion by a fixed predetermined or parameterizable number of spatially adjacent data values.

The projections can be of an arbitrary nature. In particular, they (for example in the case of computed tomography) can be one-dimensional or (for example in the case of 3D angiography) two-dimensional. They can also be parallel projections or perspective projections.

With regard to the new data values, in the simplest case for each projection the new data values are determined automatically by the computer using data values that remain unchanged from the spatial surroundings of the data values to be replaced. For example, the data values to be replaced can be replaced by the average value of the surroundings.

For each projection a mask of the data values to be replaced preferably is determined, the spatial spectrum of the data values that are remaining unchanged and of the mask are determined for each projection, and the new data values are automatically determined by the computer for each projection using the spatial spectra of the data values remaining unchanged and of the mask. An adaptive filtering or median filtering in particular can ensue. The filtering also can ensue the manner specified by Til Aach and Volker Metzler in their essay, "Defect interpolation in digital radiography—how object-oriented transform coding helps", published in Proceedings of SPIE, Volume. 4322 (2001), pages 824 through 835.

DESCRIPTION OF THE DRAWINGS

FIG. 1 is a schematic illustration of an imaging medical system operable in accordance with the principles of the present invention.

FIG. 2 is a plan view of the rotational plane in the imaging medical system of FIG. 1.

FIG. 3 is a schematic illustration of a projection for the acquisition of data in the imaging medical system of FIG. 1.

FIG. 4 is a flowchart explaining the basic steps of the inventive method.

FIGS. 7 through 10 are respective flowcharts for various embodiments for replacing data in the method of the invention.

FIGS. 12–15 are flowcharts for further embodiments of the inventive method.

DESCRIPTION OF THE PREFERRED EMBODIMENTS

Figure 5:
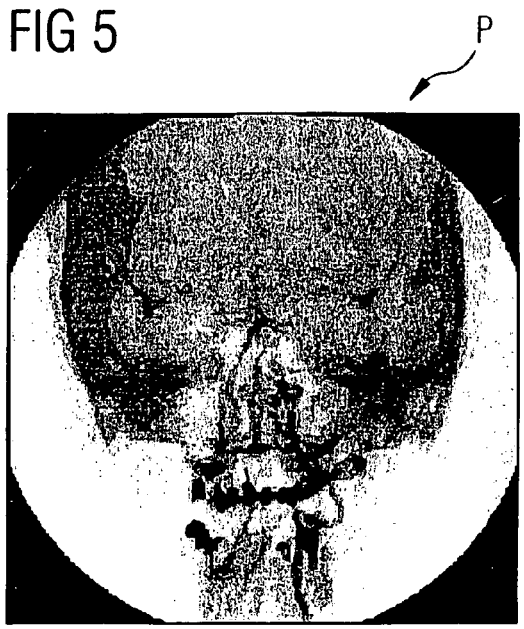
FIG. 5 is an example of a projection obtained in the first step of the inventive method.

According to FIGS. 1 through 3, show an imaging medical system having a radiation source 1 and a radiation detector 2. The radiation source 1 and the radiation detector 2 form an acquisition arrangement that can be rotated on a common axis 3. A three-dimensional subject 4 (for example a person or a body part of a person) to be irradiated is disposed in the region of the pivot axis 3.

The radiation source 1 is fashioned substantially punctiform. A projection P acquired by the radiation detector 2 is thus substantially a perspective projection of the subject 4. Given suitable fashioning of the radiation source 1, the projection P, however, also could be a parallel projection.

As particularly can be seen from FIG. 3, the radiation detector 2 has a two-dimensional arrangement of sensors 5. The projection P provided by the radiation detector 2 is thus a two-dimensional projection. Each projection P thus corresponds to a dataset that has a number of spatially contiguous data values $f_{ij}$. In principle, the radiation detector 2 alternatively could have only a single line of sensors 5. In this case, the projection P would be one-dimensional.

The imaging medical system, for example, can be an x-ray system. According to FIGS. 1 through 3, it is an x-ray angiography system, however, other imaging medical systems, for example a computed tomography apparatus, also could be used.

The imaging medical system is controlled by a computer 6. The computer 6 in turn receives commands from a user 7. Among other things, the computer 6 controls the (mutual) pivoting of the radiation source 1 and the radiation detector 2 on the axis 3. During the rotation, it also controls the radiation source 1, as to radiation emission. Furthermore, the computer 6 reads in projections P acquired by the radiation detector 2.

As a rule, a rotation by a rotation angle a ensues as shown in FIG. 2. During the rotation, a projection P is read into the computer 6 after scanning of an incremental angle β. A shown in FIG. 2, the rotation angle α is approximately 90°. As a rule, however, the rotation angle α is greater than 90°, usually greater than 180°. Given the exposure of sufficiently many projections P, a three-dimensional reconstruction of the subject 4 is then possible according to the Feldkamp algorithm.

The ratio of the rotation angle α to the incremental angle β determines the number N of the acquired projections P. The number N is normally between 40 and 400. Each projection O forms, as already mentioned, a dataset of spatially contiguous data values $f_{ij}$.

The computer 6 reconstructs an image of subject 4 using the projections P. The computer 6 thus determines a volume dataset $V_{xyz}$ using the data values $f_{ij}$ that—ideally—corresponds to the subject 4. Such methods are known. The aforementioned Feldkamp algorithm is an example, as specified in the essay "Practical Cone-beam Algorithm" by L. A. Feldkamp, L. C. Davis and J. W. Kress, published in JOSA A1, 612 (1984).

The computer 6 is programmed with a computer program 8 to implement the determination method—and also to control the imaging medical system. The computer program 8 has been previously supplied to the computer 6 via a data medium 9 on which the computer program 8 is stored. The data medium 9, for example, can be a CD-ROM on which the computer program 8 is stored in exclusively machine-readable format. Other data media 9 are conceivable, for example a listing on paper. A remote loading of the computer program 8 is also possible. In this case, the data media 9 would be the hard drive or a similar storage medium of a server.

To determine the three-dimensional reconstruction of the likewise three-dimensional subject 4, the computer 6 implements the method subsequently explained in detail in connection with FIG. 4. Additional reference is also made to FIG. 1 through 3 as well as to FIGS. 5 and 6. Details of the step sequence are then explained in detail in connection with FIGS. 7 through 18.

According to FIG. 4, in a step S1 the computer 6 initially acquires the projections P and stores them internally. As an alternative to the acquisition of the projections P, the projections P could, however, also be otherwise provided to the computer 6. The computer 6 thus does not have to directly control the acquisition of the projections P.

FIG. 5 shows, as an example an exposure or projection P of a human skull. In this exposure, the radiation source 1 is arranged behind the back of the head of the person. The radiation detector 2 is arranged in front of the face of the person. Clearly recognizable in FIG. 5 are dark zones in the dentition region 10 of the person.

In a step S2, the data values to be replaced are then determined (localized). The details of the determination of the data values to be replaced are described in detail below.

In a step S3, the data values to be replaced are then replaced by new data values. The replacement of the data values is also gone described in detail below. The other data values that are not to be replaced remain unchanged. The computer 6 generates thusly changed projections P'.

Figure 6:
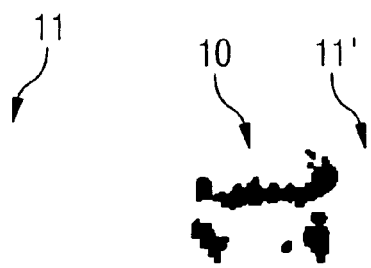
FIG. 6 is an example of a mask of dark values to be replaced in the projection of FIG. 5.

FIG. 6 shows the data values to be replaced for the projection P of FIG. 5. They are elements that are arranged in the dentition region 10, as well as data values that are arranged in the ear regions 11, 11' of the person.

In a step S4, the computer 6 determines the reconstruction of the subject 4 using the changed projections P'. The determination ensues according to known reconstruction algorithms, for example according to the Feldkamp algorithm.

Figure 7:
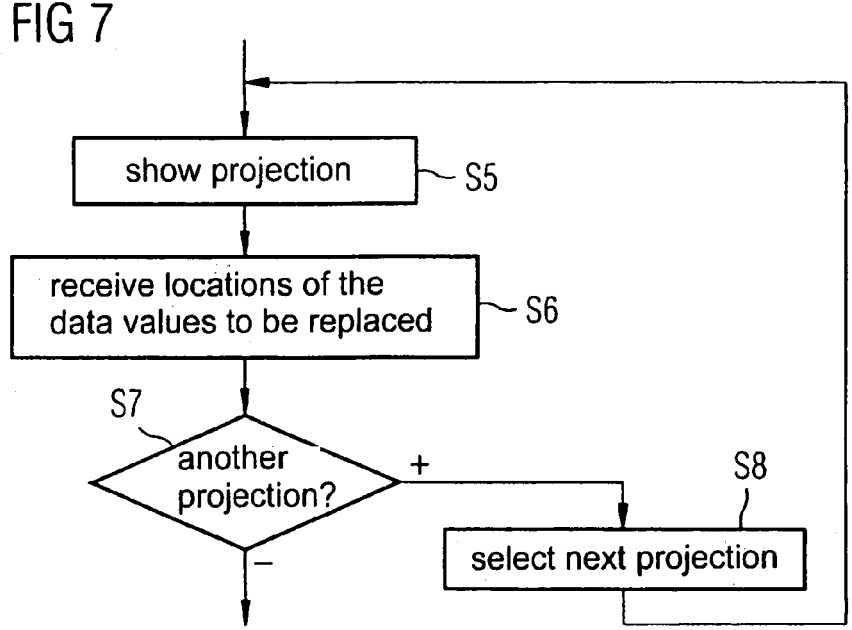

The step S2 of the method according to FIG. 4 can be fashioned in a simpler version of the inventive determination method, as shown in FIG. 7. According to FIG. 7, in a step S5 one of the projections P—for example the projection according to FIG. 5—is shown in a display device 12 by the computer 6. It is then predetermined by the user 7 which data values are to be replaced. In a step S6, the computer 6 thus receives locations of the data values to be replaced. The marking by the user 7, for example, can ensue by moving a cursor onto a location and entering a click command.

In a step S7, the computer 6 then checks whether a further projection P must be processed. When this is the case, it branches to a step S8 and there selects the next projection P. The computer 6 then passes from the step S8 back to the step S5. When all projections P are processed, starting from step S7, the routing according to FIG. 7 is abandoned. In this case, the step S3 of FIG. 4 is continued.

As is particularly clearly visible from FIG. 3, each point of a projection P corresponds to a projection line in space. The selection of a point from a projection P thus establishes a line in space. As an alternative to the procedure according to FIG. 7, it is therefore possible, in a somewhat more comfortable version of the inventive determination method, to show in a step S9 a first projection P1 on the display device 12, and in a step S10 to receive locations in the first projection P1. The steps S9 and S10 correspond in terms of context with the steps S5 and S6 of FIG. 7.

In a step S11, a second projection P2 is then shown on the display device 12. Also with regard to this projection P2, in a step S12 the computer 6 again receives locations for the data values to be replaced. The steps S11 and S12 also correspond in terms of content to the steps S5 and S6 of FIG. 7.

By this procedure, it is possible in the step S13 for the computer 6 to determine locations in space at which corresponding projection lines of the first and of the second projections P1, P2 cross. The locations in space defined by the crossing points then can be imaged in the other projections P. In a step S14, the locations in the other projections P can be automatically determined by the computer 6. In the procedure according to FIG. 8, the user 6 thereby no longer has to provide the data values to be replaced in N=40 . . . 400 projections, but rather only with regard to two projections P1, P2.

The procedure according to FIG. 8 ensues most efficiently in that the two projections P1, P2 are shown simultaneously. The display can ensue with each projection on its own display device 12. The display also can ensue in two windows of a single display device 12. The provision of a point in, for example, the projection P1 then automatically leads to the display of a corresponding line in the projection P2. By marking points on this line, a location (see, for example, the arrow in FIG. 3) or a number of locations in space are clearly determined.

In a further variant of the inventive determination method according to FIG. 9, it is also possible that, in a step S15, the computer 6 initially determines a preliminary reconstruction using the acquired (unchanged) projections P. This preliminary reconstruction is then shown via the display device 12. With regard to this preliminary reconstruction, in a step S16 the computer 6 receives locations in space that are provided by the user 7. With regard to these locations, in a step S17 the computer 6 automatically determines the corresponding locations, and therewith the data values to be replaced in the acquired projections P.

The advantage of the procedure according to FIG. 9 in comparison to that of FIG. 8 is that, although the preliminary reconstruction according to the step S15 is at risk of artifacts, the artifacts do not occur everywhere. In most cases, the implementation of the steps S16 and S17 therefore is not necessary at all. When they are necessary, in step S16 the user 7 can directly mark in space the potential error sources based on his knowledge about possible error sources.

In the procedure according to FIGS. 7 through 9, the data values to be replaced are directly or indirectly determined by the user 7. However, it is also possible for the data values to be replaced to be automatically determined by the computer 6 using the data values of the projections. This is subsequently explained in detail in connection with FIG. 10 through 16.

Figure 10:
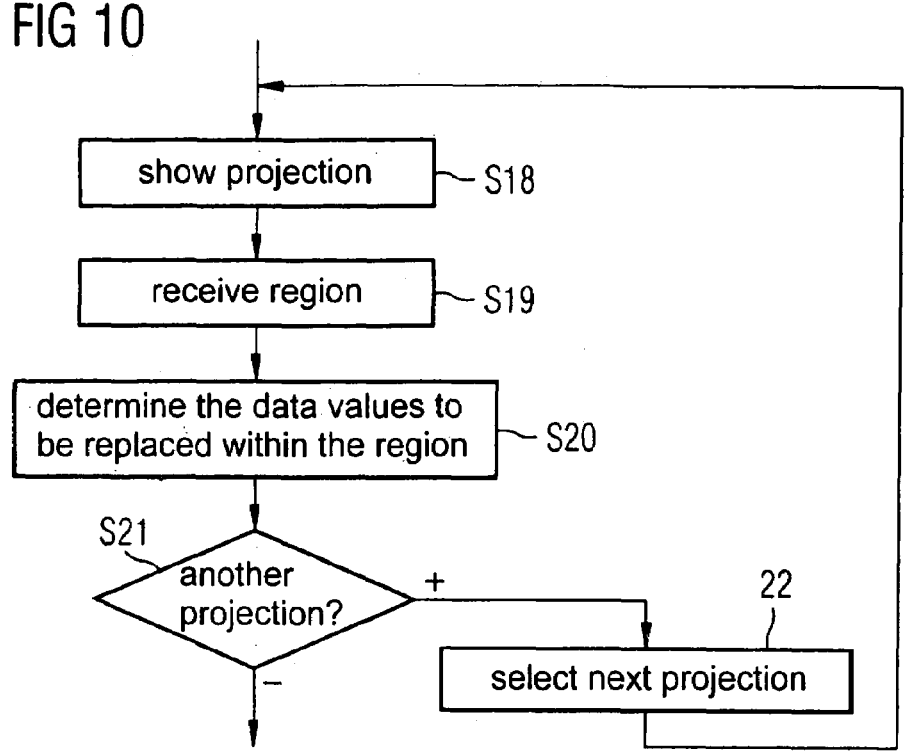
Figure 11:
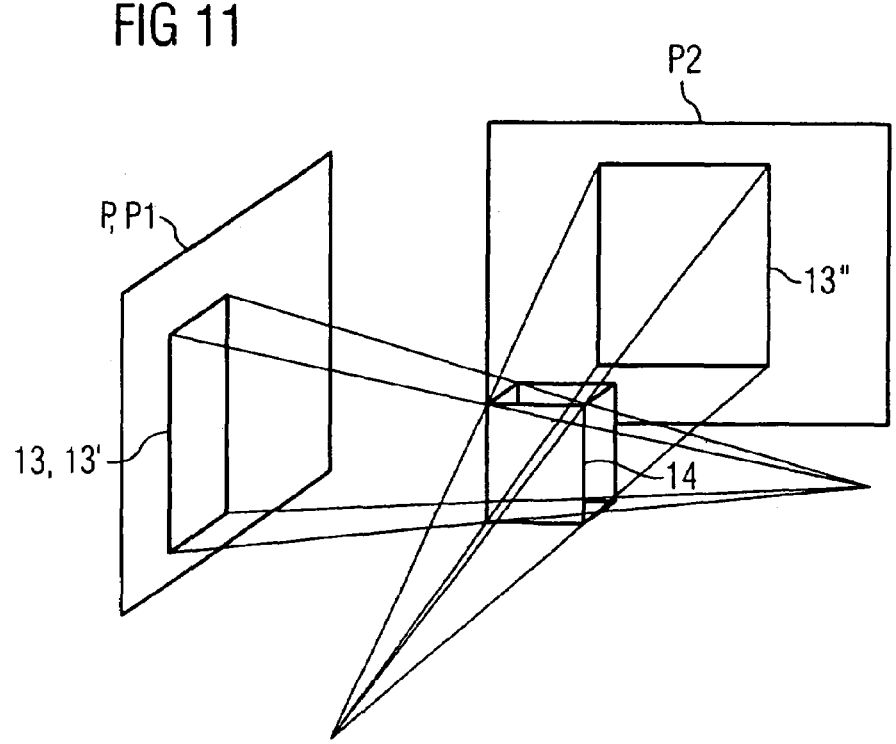
FIG. 11 illustrates the principle of triangulation used in the inventive method.

According to FIG. 10, in a step S18 it is, for example, possible to display a projection P on the display device 12 in a manner analogous to the step S5 of FIG. 7. With regard to this projection P, at least one region 13 (see FIG. 11) is then provided by the user 7 to the computer 6. The region 13 is spatially contiguous. In step S19, the computer 6 receives this region 13. The region 13 can, for example (see FIG. 5 and 6) correspond to the dentition region 10 of the person.

In a step S20, the computer 6 then determines the locations of the data values to be replaced of this projection P. The determination is undertaken by the computer 6 exclusively within the predetermined region 13. Alternatively, a determination exclusively outside of the region 13 would also be possible. The details of the determination are gone into more closely later in connection with FIG. 14 through 16.

Analogous to FIG. 7, in a step S21 the computer 6 then checks whether a projection P is still to be displayed and processed. When this is the case, the computer 9 initially branches to a step S22 in which it selects the projection P. It then jumps back to step S18. Alternatively, the routine according to FIG. 10 is abandoned and the step S3 of FIG. 4 is continued.

A region specification for each of the projections P thus ensues in the method according to FIG. 10. Inside of (or outside of) the predetermined regions 13, the determination automatically ensues via the computer 6.

The procedure according to FIG. 10 can also be fashioned is a more user-friendly manner. In a manner analogous to the procedure according to FIG. 8, it is (see FIG. 12), for example, again possible in steps S23 and S25 to display two projections P1, P2 via the display device 12 (or the display devices 12), and to provide regions 13', 13" for the projections P1, P2 that are received by the computer 6 in steps S24 and S26. Via corresponding slice formation, the computer 6 is in the position to determine a region 14 in space in a step S27. In a step S28, this region 14 is then automatically imaged by the computer 6 in the other projections P. The corresponding regions 13 can thus be determined there. In a step S29, the computer 6 then determines with regard to all of the projections P the locations of the data values to be replaced. The determination for each projection P ensues only inside (outside) of the predetermined or determined region 13, 13', 13".

Analogously to the procedure according to FIG. 9, it is also possible to operate directly in space. For this, in a step S30 according to FIG. 14, a preliminary reconstruction of the subject 4 is initially determined and output via the display device 12. In the preliminary reconstruction, the user 7 then provides to the computer 6 at least one spatially contiguous region 14 in space that the computer 6 receives in a step S31. In a step S32, the computer 6 automatically determines the corresponding regions 13 in the projections P. In a step S33, the computer 6 then automatically determines the locations of the data values to be replaced inside (or outside) of the regions 13 of the projections P.

FIG. 14 now shows a simple method for automatic determination of the data values to be replaced by the computer 6. According to FIG. 14, in a step S34 it is initially checked whether a data value is greater than a threshold SW1 at the location (ij) of a projection P. When this is not the case, in step S35 a mask is set to the value 1 at the location (ij). Otherwise, in a step S36, the mask at the location (ij) is set to the value zero. It is then checked in a step S37 whether all locations (ij) of the respective projection P have been processed. When this is not the case, a return to step S34 is made. Otherwise—after implementation of a corresponding check in a step S38—the next projection P is continued or the routine is finally abandoned.

In the procedure according to FIG. 14, the data values to be replaced are thus determined by the computer 6 exclusively using the values of the data values that ultimately are replaced. In the event that a region specification ensues from the user 11 within the projection P to be considered, the method according to FIG. 14 is implemented only inside or only outside of the predetermined region 13. Otherwise, it ensues with regard to the entire projection P.

Figure 15:
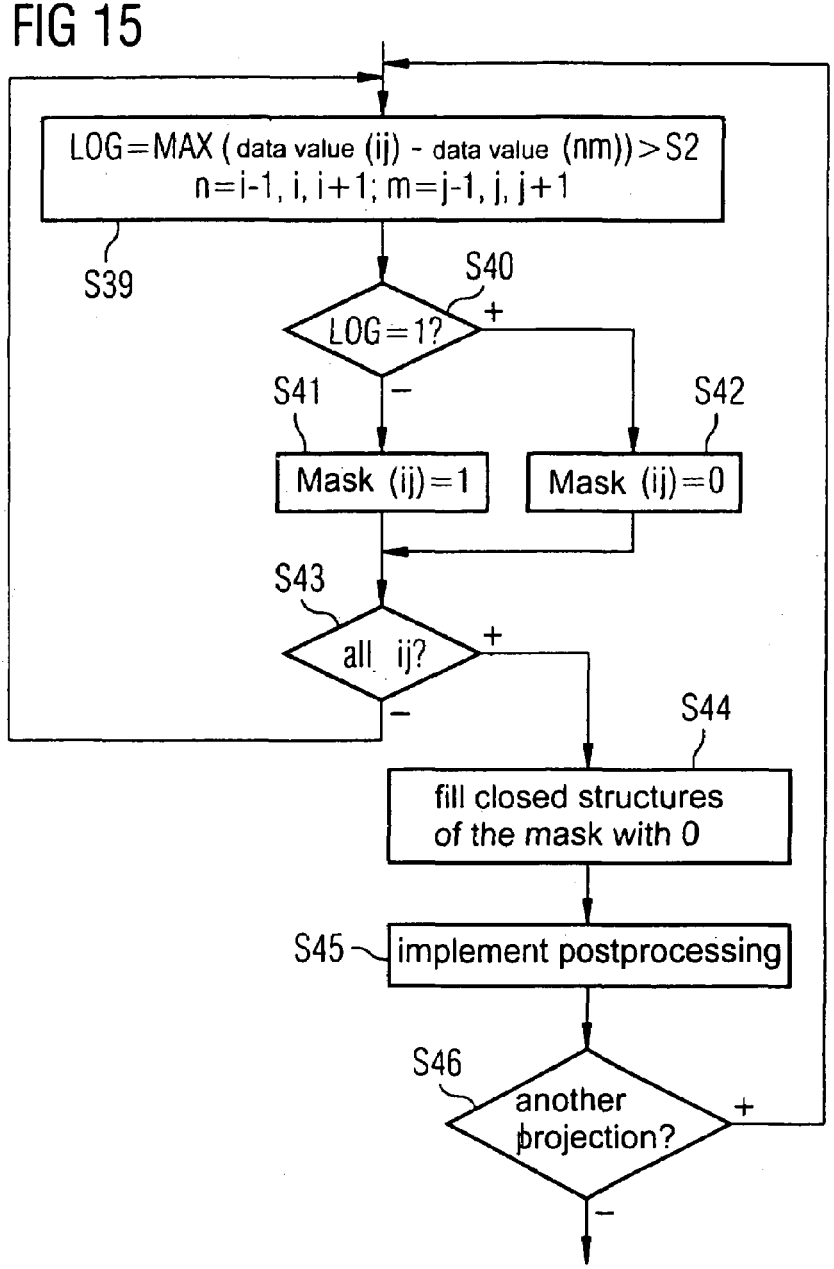

FIG. 15 now shows a further method to determine whether a data value is to be replaced or not. In the method according to FIG. 15, the data values to be replaced are determined by the computer 6 using the data values to be replaced and using the spatially directly adjacent data values.

According to FIG. 15, in step S39 the value of a logical variable LOG is initially determined. The logical variable LOG assumes the value one when the maximum of the difference of the data value at the location (ij) and the data values at the locations (nm) is greater than a threshold SW2. The index n thereby traverses the values i−1, i and i+1. The index m traverses the values j−1, j and j+1. The threshold SW2 can be fixed, can be parameterizable by the user 7, or can be determined—globally or locally—by the computer 6 itself.

In a step S40, it is checked which value the logical variable LOG has assumed. Depending on the result of the test, in the step S40 the mask at the location (ij) is either set in a step 41 to the value one or set in a step S42 to the value zero.

In a step S42, the computer 6 then checks whether it processed all locations (ij) of the respective projection P. When this is not the case, it re-executes the method according to the steps S39 through S42 at a new location (ij).

Figure 16:
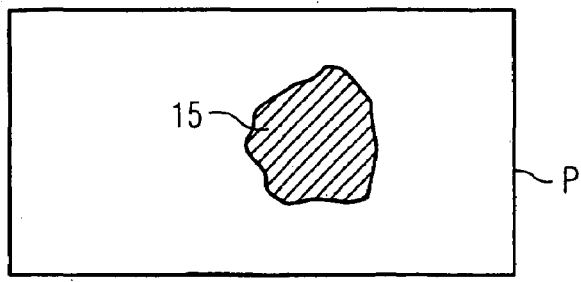
FIG. 16 schematically illustrates a projection for explaining a further version of the invention.

Otherwise, in a step S44, the computer 6 fills the closed structures of the mask with the value zero. The computer 6 thus, for example (see FIG. 16) in one of the projections P a closed contour 15 at which the mask always has the value zero. All data values within the contour 15 are then in turn data values to be replaced. This is indicated in FIG. 16 by the hatching within the contour 15. Such methods to determine closed structures 15 are generally known.

After filling the closed structures 15 in the step S44, a post-processing can follow that is, as they case may be, implemented in step S45. For example, found structures 15 can be enlarged or reduced by a (as the case may be, parameterizable by the user 7) number of pixels. A combination of both procedures is also possible. For example, closed structures can initially be expanded by five pixels and then reduced by three pixels. Given such a procedure, in particular smaller gaps can be closed.

Finally, in a step S46 the computer 6 checks whether all projections P have been processed. Depending on the result of the test, either the next projection P is continued with or the routine is abandoned.

After the specification or, respectively, determination (localization) of the data values to be replaced, the new data values naturally also have to be determined. In the simplest case, in a step 47 according to FIG. 17 the computer 6 determines an average value of the data values which surround the data values to be replaced. Thus, for example, around the closed contour 15 of FIG. 16, the average value of the data values externally surrounding the contour 15 is determined. In a step S48, is it then checked whether the mask has the value one at the location (ij). When this is not the case, the data value is to be replaced. The data value at the location (ij) is in this case replaced in a step S49 by the average value determined in step S47.

It is then checked in a step S50 whether all locations (ij) have been processed. As the case may be, the step S46 is again continued with, naturally at a new location (ij). Otherwise, the computer 6 tests in a step S51 whether all projections P have been processed. Depending on the result of the test, either the next projection P is continued with or the routine is abandoned.

Figure 17:
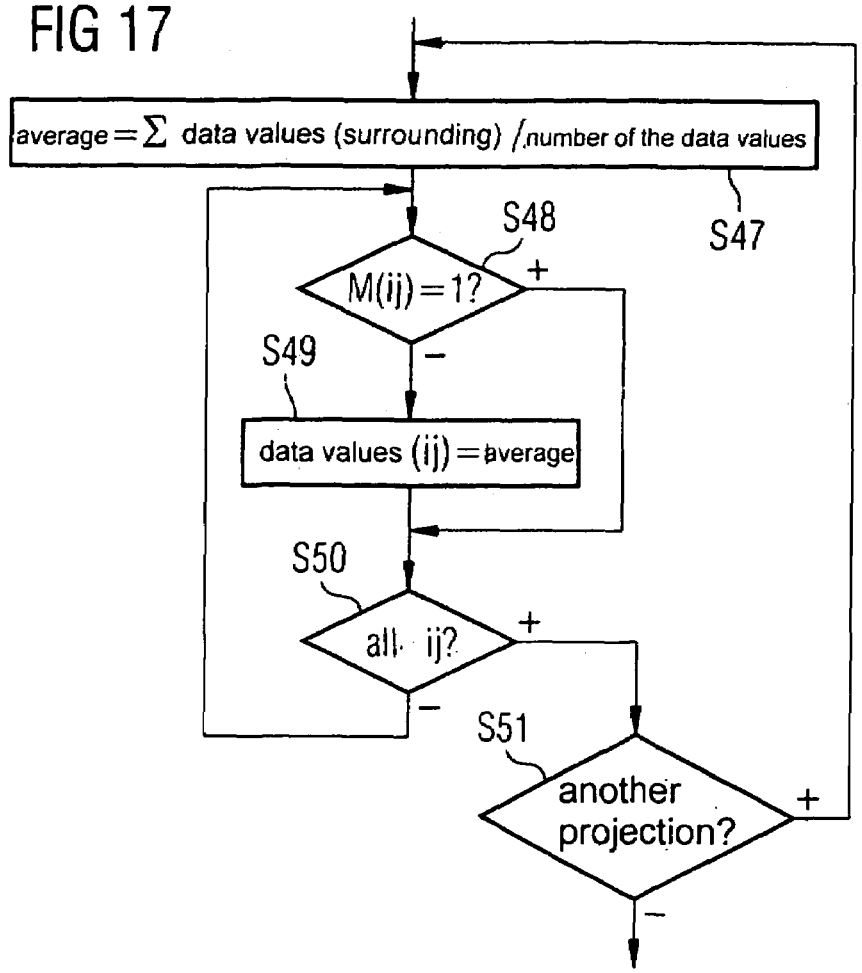
FIGS. 17 and 18 are flowcharts for explaining further embodiments of the inventive method.

In the method according to FIG. 17, for each projection P the new data values are automatically determined by the computer 6 using data values that remain unchanged from the spatial surroundings of the data values to be replaced. This procedure already provides an improved reconstruction, however, it is better to implement the method shown in FIG. 18 for each projection.

Figure 18:
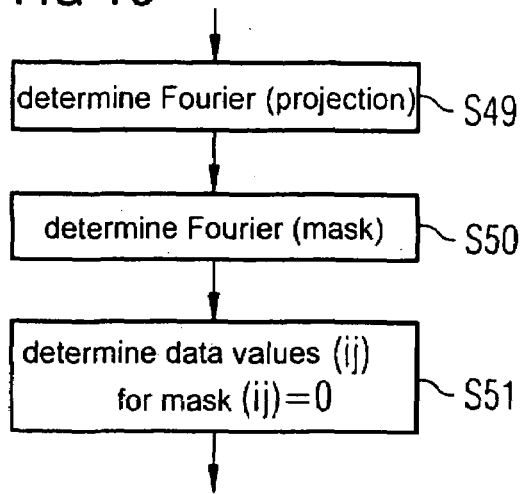

As shown in FIG. 18, in a step S52 a spatial spectrum of the data values remaining unchanged is initially determined by Fourier transformation. In a step S53, a spatial spectrum of the mask is then determined via Fourier transformation. Using both Fourier transformations, the new data values are then automatically determined by the computer 6 in step S54.

The determination can, for example, ensue in the same manner as is specified in the essay by Til Aach and Volker Metzler mentioned above. The disclosure content of this essay is therefore expressly included in the present application.

An iterative algorithm is used for this determination. The data values remaining unchanged are accepted as a product of the changed projections P' and of the mask. After the Fourier transformation, a convolution of the spatial spectrum of the data values remaining unchanged results with the spatial spectrum of the mask. Spectral components of the changed projections P' can thus be iteratively determined bit by bit. After determination of sufficiently many spectral lines, then changed projection P' can then be determined by Fourier back-transformation [reverse transformation].

Figure 19:
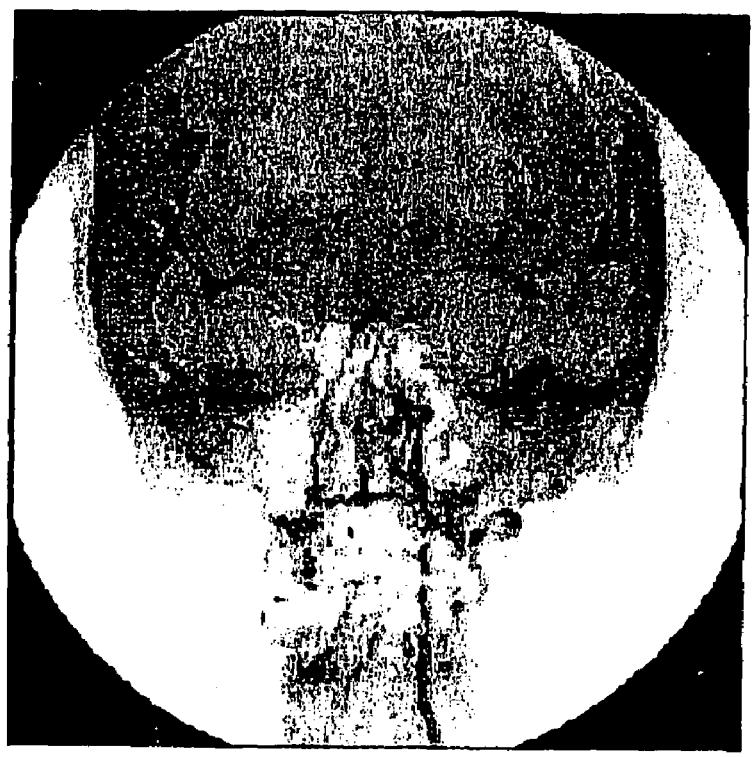
FIG. 19 shows a projection reconstructed in accordance with the inventive method.

In spite of artifact-causing elements in the subject 4, a good reconstruction of the subject 4 is thus possible in a simple manner by means of the inventive determination method. FIG. 19 shows a projection of such a reconstruction.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for reconstructing an image of a three-dimensional subject comprising the steps of:
   acquiring a plurality of projections of a three-dimensional subject, each projection comprising a dataset of spatially contiguous data values;
   supplying said projections to a computer;
   in said computer, automatically determining a first part of said data values, as data values to be replaced, and replacing said first part of the data values of the projections with new data values, with a second part of the data values of the projections remaining unchanged, and thereby generating changed projections; and
   reconstructing an image of the subject in the computer using the changed projections.

2. A method as claimed in claim 1 comprising entering into said computer a designation of at least one spatially contiguous region for each of said projections, and in said computer determining the data values to be replaced exclusively inside of said region in each of said projections.

3. A method as claimed in claim 1 comprising entering into said computer a designation of at least one spatially contiguous region for each of said projections, and in said computer determining the data values to be replaced exclusively outside of said region in each of said projection.

4. A method as claimed in claim 1 comprising the steps of:
   entering a designation of at least one spatially contiguous region into the computer for each of at least two of said projections;
   in said computer, for each of said at least two projections, automatically determining data values to be replaced exclusively inside of said spatially contiguous region; and
   in each of a remainder of said projections, automatically determining in said computer data values to be replaced exclusively inside of a region dependent on the spatially contiguous regions respectively designated in said at least two projections.

5. A method as claimed in claim 1 comprising the steps of:
   entering a designation of at least one spatially contiguous region into the computer for each of at least two of said projections;
   in said computer, for each of said at least two projections, automatically determining data values to be replaced exclusively outside of said spatially contiguous region; and
   in each of a remainder of said projections, automatically determining in said computer data values to be replaced exclusively outside of a region dependent on the spatially contiguous regions respectively designated in said at least two projections.

6. A method as claimed in claim 1 comprising the steps of:
   in said computer, generating a preliminary reconstruction of an image of the subject using the projections before replacing said first part of said data values, and displaying said preliminary reconstruction;
   designating at least one spatially contiguous region in three-dimensional space in the displayed preliminary reconstruction, as an entry into the computer;
   in said computer, determining respective regions in said projections corresponding to said spatially contiguous region entered into the computer; and
   in said computer, automatically determining said data values to be replaced exclusively inside of the respective regions in said projections corresponding to said spatially contiguous region entered into the computer.

7. A method as claimed in claim 1 comprising the steps of:
   in said computer, generating a preliminary reconstruction of an image of the subject using the projections before replacing said first part of said data values, and displaying said preliminary reconstruction;
   designating at least one spatially contiguous region in three-dimensional space in the displayed preliminary reconstruction, as an entry into the computer;
   in said computer, determining respective regions in said projections corresponding to said spatially contiguous region entered into the computer; and
   in said computer, automatically determining said data values to be replaced exclusively outside of the respective regions in said projections corresponding to said spatially contiguous region entered into the computer.

8. A method as claimed in claim 1 comprising in said computer, determining the data values to be replaced by analyzing, in each projection, each data value and data values spatially adjacent to that data value.

9. A method as claimed in claim 1 comprising in said computer, determining the data values to be replaced, as said first part of said data values, by analyzing, in each projection, each data value and data values spatially directly adjacent to that data value.

10. A method as claimed in claim 1 comprising acquiring said projections as one-dimensional projections.

11. A method as claimed in claim 1 comprising acquiring said projections as two-dimensional projections.

12. A method as claimed in claim 1 comprising acquiring said projections as parallel projections.

13. A method as claimed in claim 1 comprising acquiring said projections as perspective projections.

14. A method as claimed in claim 1 comprising, for each projection, automatically determining said new data values in said computer using data values in said second part of said data values that surround said data values in said first part of said data values.

15. A method as claimed in claim 1 comprising the steps of:
    for each of said projections, determining a mask for said data values to be replaced;
    for each projection, determining spatial spectra in said computer of the data values in said second part of said data values; and
    in said computer, determining said new data values automatically using said spatial spectra and said mask.

16. A method for reconstructing an image of a three-dimensional subject comprising the steps of:
    acquiring a plurality of projections of a three-dimensional subject, each projection comprising a dataset of spatially contiguous data values;
    supplying said projections to a computer; and, for at least two of said projections, making entries into the computer designating a first part of the data values, as data values to be replaced, in said at least two projections and, dependent on said entries, automatically in said computer replacing said first part of said data values in a remainder of the projections, with a second part of the data values of the projections remaining unchanged, and thereby generating changed projections; and thereby generating changed projections; and reconstructing an image of the subject in the computer using the changed projections.

17. A method as claimed in claim 16 comprising designating in the computer the data values to be replaced in exactly two of said projections.

18. A method as claimed in claim 17 comprising designating said data values to be replaced in exactly two of said projections that are disposed at an angle of substantially 90° relative to each other.

19. A method for reconstructing an image of a three-dimensional subject comprising the steps of:

acquiring a plurality of projections of a three-dimensional subject, each projection comprising a dataset of spatially contiguous data values;

supplying said projections to a computer;

in said computer, generating a preliminary reconstruction of an image of the subject using said projections, and displaying said preliminary reconstruction;

designating at least one location in three-dimensional space in the displayed preliminary reconstruction as an entry into the computer;

in said computer, automatically determining a first part of said data values, as data values to be replaced, from said entry;

in said computer replacing said first part of the data values of the projections with new data values, with a second part of the data values of the projections remaining unchanged, and thereby generating changed projections; and reconstructing an image of the subject in the computer using the changed projections.

20. A method as claimed in claim 4 comprising entering a designation of at least one spatially contiguous region into said computer for exactly two of said projections.

21. A method as claimed in claim 4 comprising entering a designation of at least one spatially contiguous region into said computer for exactly two of said projections that are disposed at an angle of substantially 90° relative to each other.

22. A method as claimed in claim 5 comprising entering a designation of at least one spatially contiguous region into said computer for exactly two of said projections.

23. A method as claimed in claim 22 comprising entering a designation of at least one spatially contiguous region into said computer for exactly two of said projections that are disposed at an angle of substantially 90° relative to each other.

24. A computer program stored on a computer readable-medium and loadable into a computer supplied with a plurality of projections of three-dimensional subject, each projection comprising a dataset of spatially contiguous data values said computer program programming said computer to:

automatically determine a first part of said data values, as data values to be replaced;

automatically replace said first part of the data values of the projections with new data values, with a second part of the data values of the projections remaining unchanged, and thereby generate changed projections; and reconstruct a three-dimensional image of the subject in the computer using the changed projections.

25. A computer program supplied with a plurality of projections of a three-dimensional subject, each projection comprising a dataset of spatially contiguous data values, to:

automatically determine a first part of said data values, as data values to be replaced;

automatically replace said first part of the data values of the projections with new data values, with a second part of the data values of the projections remaining unchanged, and thereby generate changed projections; and reconstruct an image of the subject in the computer using the changed projections.

26. An imaging apparatus for reconstructing an image of a three-dimensional subject comprising:

a data acquisition system adapted to interact with a three-dimensional subject for acquiring a plurality of projections of the subject, each projection comprising a dataset of spatially contiguous data values;

a computer supplied with said projections;

said computer automatically determining a first part of said data values, as data values to be replaced, and replacing said first part of the data values of the projections with new data values dependent on a user entry into the computer, with a second part of the data values of the projections remaining unchanged, and thereby generating changed projections; and said computer reconstructing an image of the subject using the changed projections.

* * * * *